(12) United States Patent
Trimberger (10) Patent No.: US 7,949,912 B1
(45) Date of Patent: May 24, 2011

(54) SYSTEM AND METHOD OF SECURING DATA STORED IN A MEMORY

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 316 days.

(21) Appl. No.: 12/354,728

(22) Filed: Jan. 15, 2009

(51) Int. Cl.
*G11C 29/00* (2006.01)
*G06F 13/00* (2006.01)
*G06F 12/14* (2006.01)
*H03K 19/00* (2006.01)

(52) U.S. Cl. ............. 714/722; 711/100; 326/8; 713/193

(58) Field of Classification Search .................. 714/722; 711/100; 326/8; 713/193
See application file for complete search history.

(56) References Cited

U.S. PATENT DOCUMENTS

| | | | |
|---|---|---|---|
| 4,997,288 A | 3/1991 | Rosenow | |
| 7,707,371 B1* | 4/2010 | Goheer et al. | 711/159 |
| 2003/0094499 A1 | 5/2003 | Endo et al. | |
| 2005/0238175 A1 | 10/2005 | Plotkin et al. | |
| 2006/0023486 A1* | 2/2006 | Furusawa et al. | 365/145 |
| 2007/0047395 A1* | 3/2007 | Skeeter et al. | 369/30.04 |
| 2007/0098158 A1 | 5/2007 | Tapson | |
| 2007/0300031 A1* | 12/2007 | Jevans et al. | 711/166 |
| 2008/0002830 A1 | 1/2008 | Cherkasov et al. | |
| 2008/0126766 A1* | 5/2008 | Chheda et al. | 712/226 |
| 2009/0100212 A1* | 4/2009 | Boyd et al. | 711/5 |
| 2010/0138619 A1* | 6/2010 | Benavides | 711/159 |

OTHER PUBLICATIONS

Cisco Systems, Inc., Cisco MDS 9000 Family Secure Erase Configuration Guide for Cisco MDS 9500 and 9200 Series, Jun. 2008, pp. i-viii, 1-1 to I1.*
Kissel et al., Guidelines for Media Sanitization Recommendations of the National Institute of Standards and Technology, Sep. 2006, NIST Special Publication 800-88, pp. 1-43.*
Kok, Data Remanence in Microcontrollers, 2007, University of Twente, pp. 1-17.*
Gutmann, Peter; "Data Remanence in Semiconductor Devices. Abstract"; Security '01 Abstract; Security '01 Technical Program; downloaded on Feb. 11, 2008 from http://www.usenix.org/events/sec01/gutmann.html; pp. 1.
Gutmann, Peter; "Secure Deletion of Data from Magnetic and Solid-State Memory"; Sixth USENIX Security Symposium; downloaded on Feb. 5, 2008 from http://www.usenix.org/publications/library/proceedings/sec96/full_papers/gutmann'; pp. 77-90.
Trimberger, Steve; Security in SRAM FPGAs; IEEE Design and Test of Computers; Copublished by the IEEE CS and the IEEE CASS; Copyright 2007 IEEE; pp. 581.

(Continued)

*Primary Examiner* — John J Tabone, Jr.
(74) *Attorney, Agent, or Firm* — David L. McCombs; Thomas George (57) ABSTRACT

A system and method of securing data stored in a memory are disclosed. The method comprises storing a payload data in a memory in one of first and second states related by a transform, reading the payload data from the memory, attempting to use the payload data for an application, verifying the payload data as being in the first state, transforming the payload data as a function of the transform in response to verifying that the payload data is in the second state, and repeating performing the verifying and transforming steps until the payload data is verified as being in the first state.

19 Claims, 4 Drawing Sheets

OTHER PUBLICATIONS

Gutmann, Peter; "Data Remanence in Semiconductor Devices"; Last changes Apr. 30, 2002; pp. 1-19.
Dyer, Joan G. et al.; "Building the IBM 4758 Secure Coprocessor"; Copyright 2001 IEEE; Oct. 2001; pp. 57-66.

U.S. Appl. No. 12/354,721, filed Jan. 15, 2009, Trimberger, Stephen M., Xilinx, Inc., 2100 Logic Drive, San Jose, CA 95124.
U.S. Appl. No. 12/031,355, filed Feb. 14, 2008, Trimberger, Stephen M., Xilinx, Inc., 2100 Logic Drive, San Jose, CA 95124.

* cited by examiner

SYSTEM AND METHOD OF SECURING DATA STORED IN A MEMORY

CROSS-REFERENCE TO RELATED APPLICATIONS

This application relates to the following commonly assigned, co-pending U.S. application Ser. No. 12/354,721: "System and Method of Detecting and Reversing Data Imprinting in Memory" by Trimberger, filed on the date hereof, which is hereby incorporated by reference in its entirety for all purposes.

FIELD OF THE INVENTION

This invention relates generally to data security, and in particular to a system and method of securing data stored in a memory.

BACKGROUND

Deleting or erasing data from magnetic disk media and random-access memory may be accomplished by various methods, such as an operation where the memory data is overwritten with other data, a delete operation, or by removing power from the device. However, storing data indefinitely in magnetic disk media or random-access memory results in an aging effect which causes traces or remnants of data to remain even after a deletion or erasure operation or after power to the memory is shut off.

This aging effect, known as data imprinting, defeats the ability to completely erase information stored in a memory. The data traces or remnants may provide sufficient information to enable the recovery of data. The longer the information is stored in a memory cell, the greater the possibility that the data will be preserved by imprinting and subsequently detectable even after erasure or deletion. Data imprinting may pose special data storage problems for security or other applications where the complete or guaranteed destruction of sensitive data is highly desirable.

SUMMARY

This disclosure describes a method and system to detect and defeat data imprinting. The data field of a memory is configured to store a payload data. Data imprinting of the payload data is detected and reversed.

According to an embodiment disclosed herein, a method comprises storing a payload data in a memory in one of first and second states related by a transform, reading the payload data from the memory, attempting to use the payload data for an application, verifying the payload data as being in the first state, transforming the payload data as a function of the transform in response to verifying that the payload data is in the second state, and repeating performing the verifying and transforming steps until the payload data is verified as being in the first state.

According to yet another embodiment disclosed herein, a system of secured data processing comprises a memory storing a payload data in one of a plurality of states without storing an indication of in which state the payload data is stored, a transformer operable to apply a transformative operation to the payload data and returning the transformed payload data to the memory to reverse data imprinting, and a verifier operable to determine the state of the stored payload data.

According to still another embodiment disclosed herein, a method and apparatus involve: storing payload data in a memory in one of first and second states that are related by a transform, without storing an indication of which state the payload data is currently in; reading the payload data from the memory; evaluating whether the payload data is in the first state; and transforming the payload data as a function of the transform to obtain transformed data if the evaluating indicates that the payload data is in a state other than the first state, and then performing the evaluating again on the transformed data.

BRIEF DESCRIPTION OF THE DRAWINGS

For a more complete understanding of the disclosure and the advantages thereof, reference is now made to the accompanying drawings, wherein similar or identical reference numerals represent similar or identical items.

DETAILED DESCRIPTION

Figure 1:
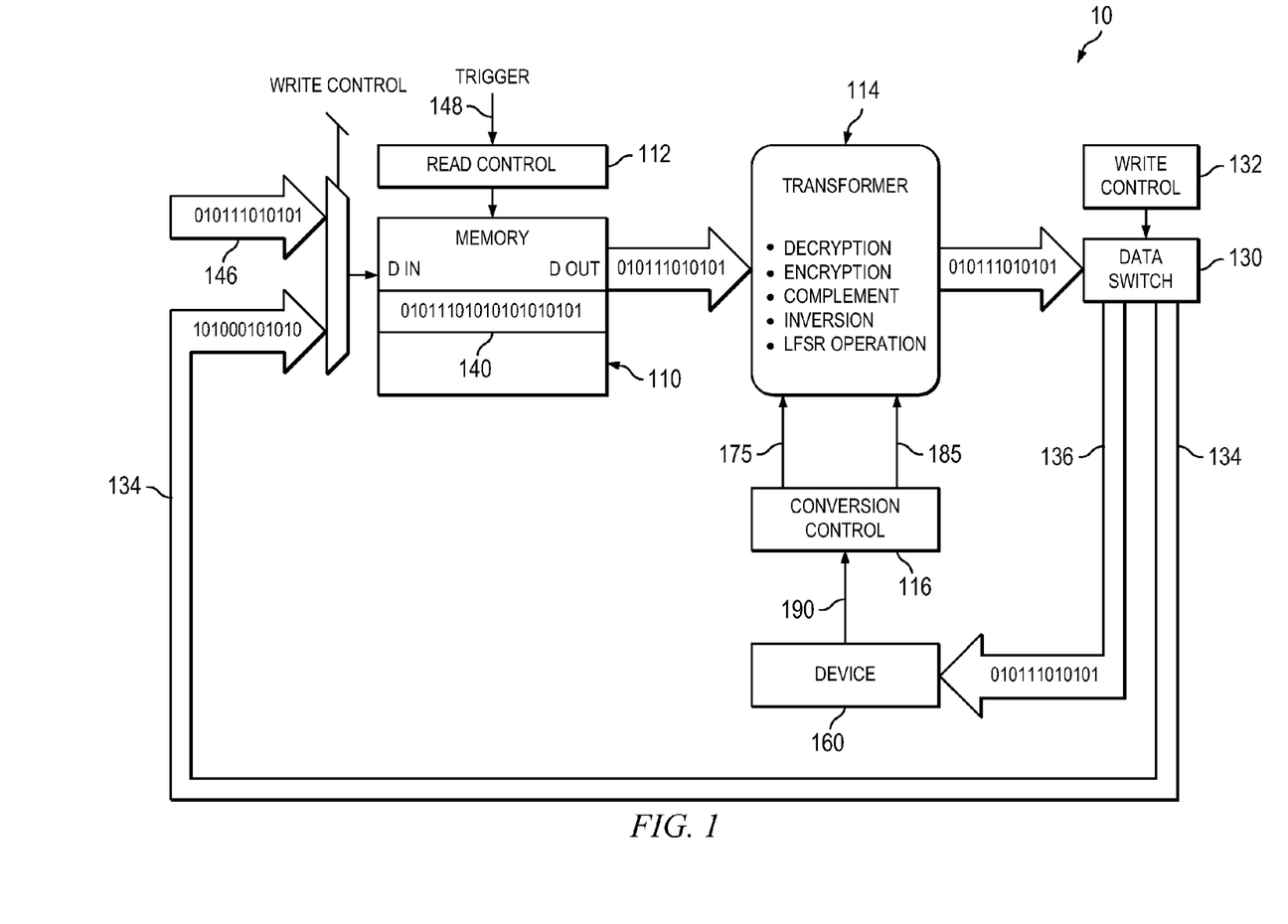
FIG. 1 is a logical block diagram according to one embodiment of the current disclosure.

FIG. 1 is a logical block diagram of a system 10 of securing data stored in a memory. System 10 may reside within or operate in conjunction with an integrated circuit, such as a programmable logic device (PLD) or a field programmable gate array (FPGA). System 10 includes a memory 110 coupled to a read controller 112. The memory 110 may receive data from a data path 146 from an external source, or data from an internal data path 134, which is discussed below. The read controller 112 controls access to a payload data 140 stored in the memory 110, which is then provided as output to a transformer 114. The transformer 114 is operable to perform any of a number of selectable functions or transforms on the data read from the memory 110, under the control of a conversion controller 116.

The converted data from the output of transformer 114 is provided to a data switch 130. The data switch 130, under the control of a write controller 132, selects a data path to output the converted data. Data path 134 directs the converted data back to the memory 110 for storage, and data path 136 directs the converted data to a device 160 for further processing, if desired. The use of the transformer 114 enables the payload data to be stored in the memory 110 in an untransformed state or in any of a number of transformed states over a period of time, so that data imprinting of the payload data in any one state is minimized and reversed. A control signal 190 is issued by the device 160 to the conversion controller 116, which instructs the transformer 114 to perform a selected transformation on the data read out of the memory 110, if desired.

According to an embodiment of the disclosure, the device 160 may be used to evaluate or determine whether the payload data read from the memory 110, in untransformed state or in a transformed state, is currently the true or untransformed value of the payload. The device 160 and the transformer 114 may perform one or a number of transformations in order to verify the true value of the payload data. The method disclosed herein is used instead of storing a token data that is indicative of the transformed state of the payload. Therefore, applications in which memory space is limited may take advantage of the method disclosed herein.

The structure and operations of the system 10 are now described in more detail. System 10 includes the memory 110 having a data field operable to store a payload data 140. The memory 110 may include, but is not limited to, magnetic disk, magnetic tape, EPROM, EEPROM, Flash memory, a static random access memory (SRAM), a dynamic random access memory (DRAM), a battery-backed RAM (BBRAM), a tag memory, or some other type of low leakage nonvolatile memory as may be known to one of ordinary skill in the art. In one embodiment, the memory 110 may be a memory organized as 32-bit words which may be serially written or accessed over multiple operational cycles. One of skill in the art should recognize that various memory device types of various organizations and sizes may be used. Storing data in the memory 110 begins the aging effect that may cause data imprinting. In some technologies, storing the data for an indefinite period of time causes imprinting of data in memory so that it can no longer be erased.

The payload data 140 stored in the memory 110 is typically a multi-bit data that may be confidential or sensitive data such as, for example, a social security number, a financial account number, a driver's license number, a password, an encryption key, or other such information that may be considered private. As such, data imprinting leads to the confidential data still being retrievable even after erasure or power-down. The payload data 140 may be alternately stored in a true, complemented, encrypted, or otherwise transformed state to minimize data imprinting. Periodically, the payload data is transformed using a selected function and written back in memory in a transformed state. Therefore, data imprinting does not progress to the extent where the payload data can be deduced by unauthorized access. One skilled in the art would recognize that a wide variety of data transformations are available to alter the bit values of the payload data and accomplish the disclosed operations.

A trigger 148 may activate a read controller 112 to read the payload data 140 from the memory 110. The trigger 148 may be configured to activate the read operation each time a device 130 powers up, for example. The trigger 148 may also be configured to activate in response to a timer. One of ordinary skill in the art should understand that other trigger activation sources may be possible. The device 160 may be a FPGA, a microprocessor, or another type of circuit or device.

The payload data 140 of the memory 110 is provided to the transformer 114 under the control of the conversion controller 116. The transformer 114 may perform a conversion of the payload data 140 using a number of functions, such as for example, encrypt, decrypt, inversion, modulo-4, data-bit shift, XOR, etc. These transformation operations are described in more detail below.

In one embodiment, the conversion controller 116 may activate a writeback conversion signal 175 to perform a writeback conversion process. In an exemplary writeback conversion process, the data read from the data field 140 is converted according to some specified scheme and written back to the memory 110. The conversion controller 116 may operate in cooperation with the write controller 132 to control the writeback of data field 140.

In another embodiment, the conversion controller 170 may activate a correction conversion signal 185 to perform a correction conversion process. In a correction conversion process, the payload data read from the data field 140 is transformed or otherwise corrected to its true value so that it may be used in subsequent processing in the device 160, for example.

Various exemplary conversion operations, with writeback conversion and correction conversion, are described in more detail below.

The conversion controller 116 may be activated to perform the conversion functions upon a device power-up or when the payload data 140 is read from the memory 110, for example. In another embodiment, activation of the conversion controller 116 may occur each time the payload data 140 is read to be used by other processes or to be written back to memory 110. In yet another embodiment, activation of the conversion controller 116 may be in response to a signal, such as an external timer or an internal device signal.

In inversion operations involving a correction conversion, the payload data 140 may be read from the memory 110, and each bit of the payload data 140 is inverted. The resulting corrected data may be used in further processing.

In inversion operations involving a writeback conversion, all bits of the payload data 140 are inverted and then written back to the memory 110. This inversion operation is used, for example, when data imprinting has reached a predetermined threshold or after a predetermined period of time. By inverting the payload data bits, the data bits become un-imprinted, i.e., the data bits imprinted with binary 0's will begin to be imprinted with 1's, and data bits imprinted with binary 1's will begin to be imprinted with 0's. In this way, the effects of data imprinting is reversed, at least temporarily, until data bits become imprinted by the inverted binary values.

As described above, the transformer 114 may perform encryption and decryption operations. In such operations, the payload data 140 may function as a secret identifier such as a cryptographic key or part of a cryptographic key. The encryption and decryption operations may also be applicable for a correction conversion operation and a writeback conversion operation.

In encryption and decryption operations involving a correction conversion, the payload data is passed through a decryption algorithm. The output of the decryptor would then be the corrected or true data that may be used in further processing.

In encryption and decryption operations involving a writeback conversion, the payload data may be read from memory and encrypted. The converted payload may then be written back to the memory 110.

In one embodiment, the transformer 114 may perform a modulo-4 arithmetic operation.

In one embodiment, the transformer 114 may function like a linear feedback shift register (LFSR). An LFSR may be used to generate pseudo-random numbers to scramble the payload data bits 140. The process of randomizing the payload bits may be effective in defeating the occurrence of data imprinting, because the bits that are stored are not correlated with the actual or true data that could represent sensitive data.

Referring to FIG. 1, the converted payload data may be written back to memory 110 via a data path 134, or may be provided to the device 160 for further verification and/or processing through a data path 136. The data switch 130 or other suitable routing device known to one of skill in the art may be used to select datapath 134 or 136. The write controller 132 may be used to control data switch 130 to select the desired datapath. It should be noted that the number of datapaths and the size of the control data switch may vary depending on implementation specifications. For example, there may be a plurality of devices in the system that require the use of the converted payload data. In such a case, the number of datapaths and the size of the control data switch may be increased to accommodate the system requirements.

Figure 2:
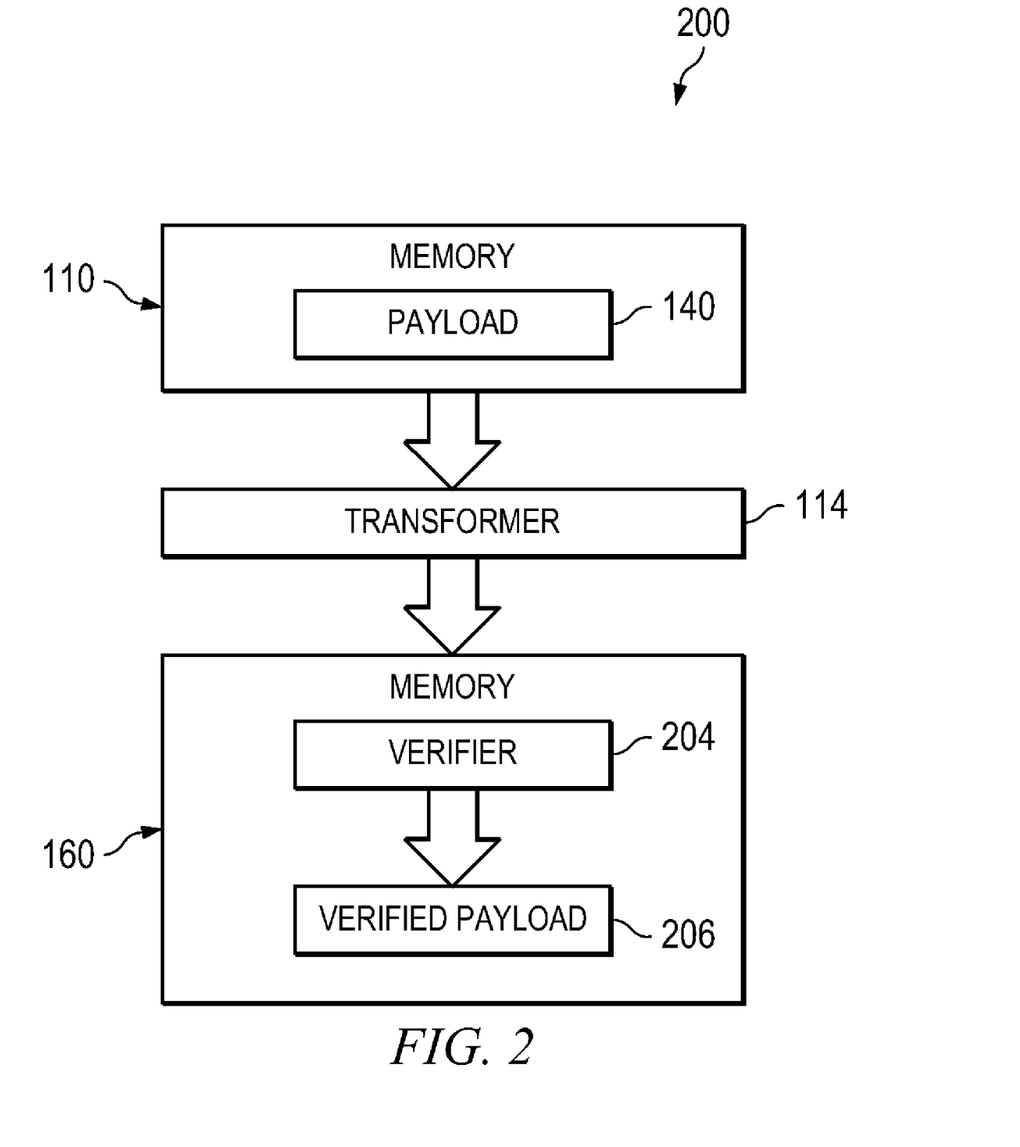
FIG. 2 is a more detailed block diagram according to one embodiment of the current disclosure.

FIG. 2 is a more detailed block diagram. The payload data 140 is a multi-bit data that is stored in the memory 110. The payload data 140 may be read from the memory 110 and provided to the transformer 114 which applies a transformative operation to the payload data, as described above. The transformer 114 may also pass the payload data 140 as read from the memory 110. The payload data is then provided to a verifier 204, which may be part of the device 160. The verifier 204 is operable to examine the payload data, whether untransformed or in a transformed state, to determine if the payload data is the correct value of the payload data. The verifier 204 may also or instead apply the payload data as what it is intended for to see if it yields a valid result. A verified payload data 206 is then generated for application or use by the device 160, for example.

For example, it is known that credit card numbers have a fixed number of digits and the first predetermined number of digits follow predetermined bit patterns for various issuing financial institutions of the credit card. Therefore, if the payload data represents a credit card number, for example, then the verifier 204 examines the payload data to determine whether it contains a predetermined pattern of a valid credit card account number. If the payload data does not follow the patterns of a credit card account number, then the payload data is transformed again using a different transformative function and the process is repeated until a payload data that follows the known parameters of the credit card account number is generated. If the payload data appears to be a valid credit card number, the verifier 204 may also attempt to use the payload data as a credit card account number, for example, by charging the sale of a product or a service to the credit card number indicated by the payload data. If billing to the credit card account number fails, then a different transformation of the payload data is performed. The process is repeated until billing to the credit card number is successful.

In certain applications, it is known that the data should not include certain invalid bit patterns. In that case, the verifier 204 examines the payload data, whether or not transformed, and searches for the illegal bit patterns. If found, then a different transformation of the payload data is performed, and the process repeats until the payload data does not contain any illegal bit pattern.

In an embodiment where the payload data is a decryption key, the verifier 204 examines the redundant structure of the key as represented in the payload data. For example, if the protected data is text, the verifier 204 may examine the output of the decryptor using the payload data as the decryption key. If the result after decryption is not valid text, then a different transformation of the payload data is performed, and the process is repeated until valid text is produced.

In another exemplary embodiment, the payload data is used as a decryption key to yield a bit stream. A checksum is then computed of the produced bit stream. The result is then compared with a stored checksum. If the checksums match, then the payload data is the correct decryption key. If the checksums do not match, then another transformative operation is performed again on the payload data, and the process is repeated until the checksums match. Alternatively, a hashed message authentication code, or some other value may be computed instead of the checksum to verify the validity of the payload data.

In another exemplary embodiment, the payload data may be stored with an error correction code, such as a single-error-correction-double-error-detection (SECDED) code. When the payload data is needed, both the payload data and the error correction code are read and the error correction syndrome is computed. If there is an indication of a double error or more, then the payload data and the error correction code were stored in a transformed state. Therefore, the payload data and error correction code read from memory is transformed, and this process is repeated until a successful result is achieved. In this embodiment, the error correction code serves two functions: to correct error bits and as an indication that transformation was done on the payload data. For applications in which the error correction code was already employed, no additional space is needed to store a separate token.

It should be noted that in FIG. 2, the verifier 204 may process the payload data read from memory prior to the processing by the transformer 114, or vice versa. In other words, the verifier may inspect, compute checksum, compute error correction value, and/or attempting to use the payload data prior to the transforming step, or vice versa.

Figure 3:
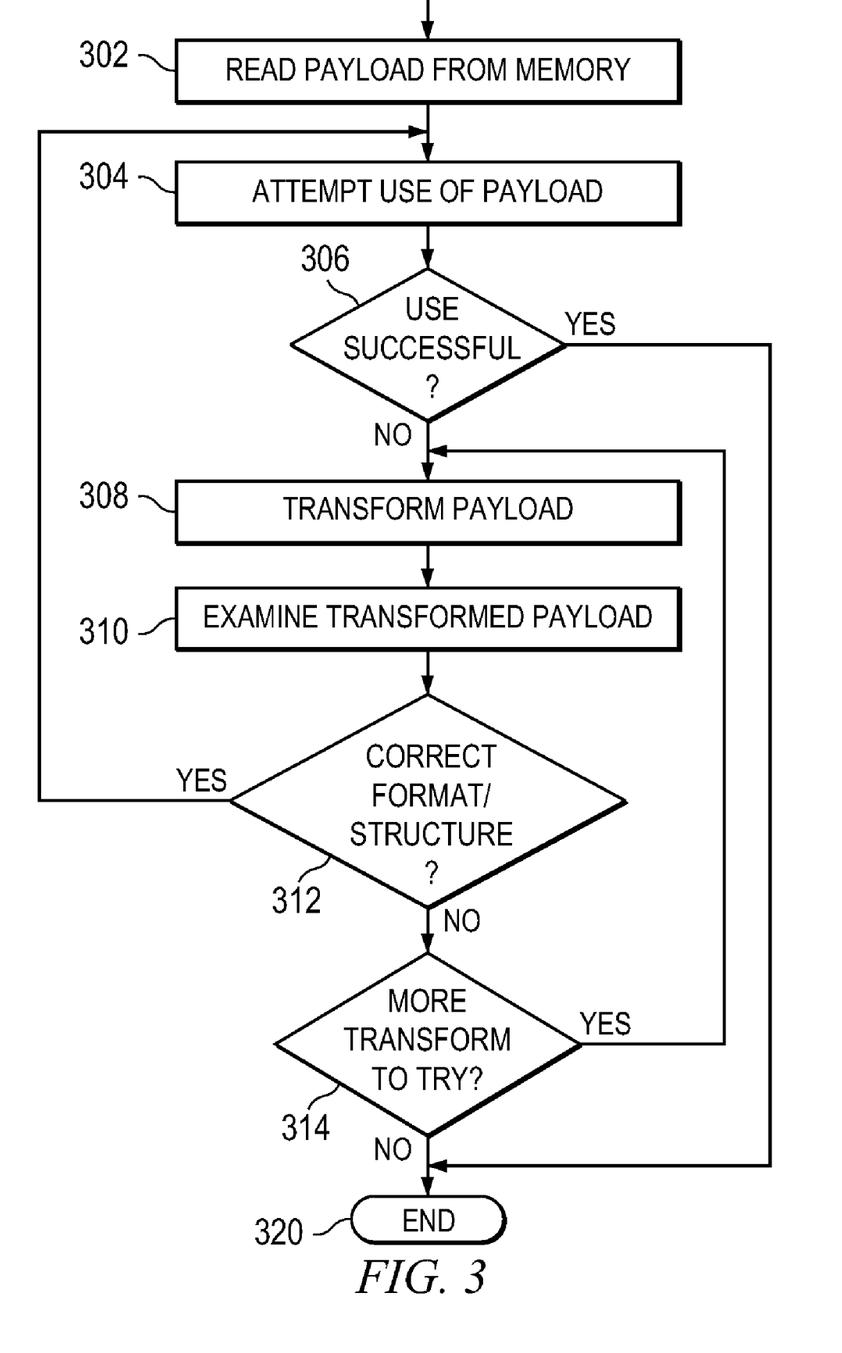
FIG. 3 is a flowchart of a method of securing data stored in memory according to one embodiment of the current disclosure.

FIG. 3 is a flowchart of a method of securing data stored in a memory according to one embodiment. It is assumed that the payload data 140 is stored in the memory 110. As the memory 110 stores data over time, data imprinting gradually takes place. In block 302, the payload data is read from the memory 110. The payload data may be read when the data is needed for processing, for example. In block 304, the payload, as read from the memory 110, is used. If use is successful, as determined in block 306, then the payload data was stored in its true non-transformed form. The process ends in block 320. If use was not successful, then in block 308 the payload data is transformed by one of many predetermined transformation operations. For example, if it is known that the payload data may be stored in an inverted form, then inversion is applied in block 308.

In blocks 310 and 312, the transformed payload data is examined and verified to determine whether it has the correct format or structure. For example, if it is known that the data should include a valid bit pattern, the payload data is examined to determine whether it is present. Alternatively or in addition, the payload data may be examined to determine whether it contained illegal bit patterns. Other examples are described above in conjunction with FIG. 2. If the payload data has the requisite format and/or structure, then another attempt is made to use the payload data. If the payload data does not have the correct format or structure, then in block 314 a determination is made as to whether there are more transform operations within the set of possible operations that have not yet been tried.

If there are more transforms to be tried, then the process proceeds to block 308, where another transformation is performed, and the process is repeated. If there are no more transforms to be tried, then the attempted use of the payload data failed and the process ends in block 320.

It should be noted that the sequence of the steps shown in FIG. 3 need not follow the flowchart identically. For example, the payload data read from the memory may be transformed prior to the attempted use if it is known that the payload data is always stored in a transformed state. Further, the payload data may be examined after it is read from the memory for correct data structure and format prior to the attempted use.

In one embodiment, the method described herein may be applied to a configuration bit stream of an FPGA, where the payload data is an encryption/decryption key of the configuration bet stream. On power-up, the configuration bit stream is loaded and an attempt to use the payload data or key to decrypt the configuration bit stream. If the key or payload data was stored in a non-transformed state, then FPGA configuration is successful. However, if the key was stored in a transformed state, then configuration would fail. In that instance, an alternate fallback configuration bit stream is loaded into the FPGA. The fallback configuration bit stream is one that was prepared with the transformed key or payload.

Figure 4:
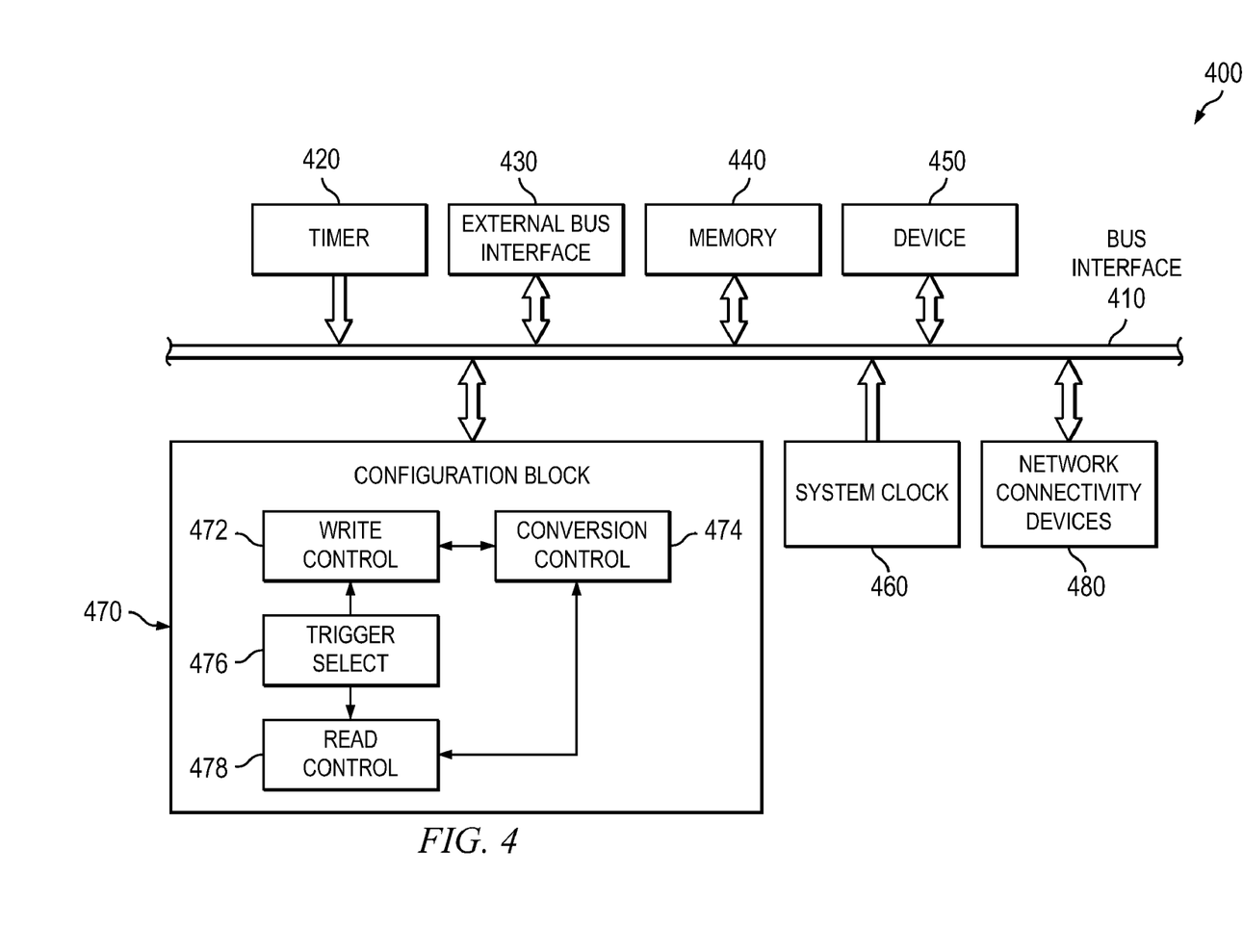
FIG. 4 is a block diagram of an exemplary environment that may be operable for various embodiments of the current disclosure.

FIG. 4 is a block diagram of an exemplary system 400 that may be operable for various embodiments of the current disclosure. The methods described herein may be implemented by any memory device or information processing system that uses devices for the storage of data. System 400 includes a memory 440 in communication with a device 450 through a bus interface 410. System 400 may also include a timer 420, external bus interface 430, system clock 460, configuration block 470, and network connectivity devices 480, for example, that communicate via the bus interface 410. The memory 440 may be external or internal to the device 450. In a preferred embodiment, the memory 440 may be a low leakage battery-backed RAM (BBRAM). The low leakage feature of the BBRAM would potentially extend the life of the battery and is energy efficient. However, other types of memory devices may be used, as would be recognized by one of skill in the art.

In one embodiment, the device 450 may be a central processing unit that executes instructions, codes, computer programs, and scripts, which it may access from the memory 440 or other network connectivity devices. The memory 440 may include computer readable media such as a RAM, ROM, PROM, hard disk, floppy disk, optical disk, or other secondary storage media. Further, the device 450 may be a programmable logic device (PLD).

The network connectivity devices 480 may take the form of modems, modem banks, Ethernet cards, universal serial bus (USB) interface cards, serial interfaces, token ring cards, fiber distributed data interface (FDDI) cards, wireless local area network (WLAN) cards, and other well-known network devices. The network connectivity devices 480 may enable the device 450 to communicate with the Internet, an intranets, and/or one or more computer networks. The network connection may enable the device 450 to receive information from a network or output information to the network in the course of performing the methods disclosed herein. The information may be represented as a sequence of instructions to be executed using device 450.

The configuration block 470 may include various components that control the processes in embodiments of this disclosure. Specifically, in the configuration block 470, a write control 472 may control the write processes to and from memory 440. The write control 472 may also control the write processes from the memory 440 to the device 450. A trigger select 476 may output a trigger signal that initiates the data field read from memory 540 in response to the occurrence of one or more conditions. A read control 478 may determine what data locations are read from the memory.

The conversion control 474 may determine whether a writeback conversion or correction conversion operation should be performed. One of skill in the art should recognize that the components of the configuration block 470 may vary based on implementations. Other component blocks may be required to implement system functions specific to a given design implementation.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various methods, techniques, or elements may be combined or integrated in another system, or certain features may be omitted or not implemented.

What is claimed is:

1. A method comprising:
   storing a payload data in a memory in one of non-transformed and transformed states related by a transform;
   reading the payload data from the memory;
   attempting to use the payload data for an application that employs the payload data in the non-transformed state;
   if the attempt to use the payload data is unsuccessful, transforming the payload data as a function of the transform in response to verifying that the payload data is in the transformed state; and
   repeating performing the attempting to use and transforming steps until the payload data is in the non-transformed state.

2. The method of claim 1, further comprising verifying the payload data is in the non-transformed state.

3. The method of claim 2, wherein verifying the payload data comprises inspecting the payload data.

4. The method of claim 3, wherein inspecting the payload data comprises searching for a known bit pattern.

5. The method of claim 3, wherein inspecting the payload data comprises determining an adherence to a predetermined format.

6. The method of claim 3, wherein inspecting the payload data comprises computing an error correction value based on the payload data.

7. The method of claim 3, wherein inspecting the payload data comprises computing a checksum value based on the payload data.

8. The method of claim 1, wherein transforming the payload data comprises transforming the payload data according to at least one transforming operation selected from the group consisting of inversion, encryption, decryption, XOR, modulo-4, and data-shifting.

9. The method of claim 1, wherein storing the payload data comprises storing a confidential data selected from the group consisting of a financial account number, a social security number, a password, an encryption key, and a decryption key.

10. A system of secured data processing, comprising:
    a memory storing a payload data in one of a plurality of states without storing an indication of in which state the payload data is stored, wherein the plurality of states includes a non-transformed state and a transformed state;
    a transformer operable to apply a transformative operation to the payload data and returning a converted payload data to the memory to reverse data imprinting; and
    a verifier operable to determine the state of the converted payload data, and to attempt to apply the converted payload data for its intended application to determine whether the converted payload data is in the non transformed state,
    wherein the transformer applies another transformative operation to the converted payload data if the verifier determines that the converted payload data is in the transformed state.

11. The system of claim 10, wherein the verifier further inspects the converted payload data.

12. The system of claim 10, wherein the verifier further computes a checksum based on the converted payload data.

13. The system of claim 10, wherein the verifier further computes an error correction value based on the converted payload data.

14. The system of claim 10, wherein the transformer is operable to transform the payload data according to at least one transforming operation selected from the group consisting of inversion, encryption, decryption, XOR, modulo-4, and data-shifting.

15. The system of claim 10, wherein the memory comprises a battery-backed RAM.

16. The system of claim 10, wherein the verifier comprises a processor.

17. A method comprising:
   storing payload data in a memory in one of non-transformed and transformed states that are related by a transform, without storing an indication of which state the payload data is currently in;
   reading the payload data from the memory;
   evaluating whether the payload data is in the non-transformed state;
   transforming the payload data as a function of the transform to obtain transformed data if the evaluating indicates that the payload data is in a state other than the non-transformed state; and
   repeating performing the evaluating and the transforming until the payload data is in the non-transformed state.

18. The method of claim 17, wherein the evaluating includes at least one of:
   inspecting the payload data;
   computing an error correction value based on the payload data;
   attempting to use the payload data; and
   computing a checksum based on the payload data.

19. The method of claim 17, wherein the transforming includes at least one of:
   inverting the payload data;
   complementing the payload data;
   encrypting the payload data;
   decrypting the payload data;
   subjecting the payload data to a shift operation;
   subjecting the payload data to an exclusive OR operation; and
   subjecting the payload data to a modulo-4 operation.

* * * * *